United States Patent [19]

Nakamura et al.

[11] Patent Number: 5,071,949
[45] Date of Patent: Dec. 10, 1991

[54] PROCESS FOR PREPARATION OF POLYPHENYLENE-SULFIDE RESINS IN THE ABSENCE OF SPECIFIC POLYMERIZATION ASSISTANTS

[75] Inventors: Yoshiaki Nakamura, Chiba; Kazuyoshi Nagaki, Urayasu; Yuichiro Shiro, Kobe; Kazuhiro Kawamata, Ichikawa, all of Japan

[73] Assignee: Tohpren Co., Ltd., Tokyo, Japan

[21] Appl. No.: 423,565

[22] Filed: Oct. 16, 1989

Related U.S. Application Data

[63] Continuation of Ser. No. 30,924, Mar. 27, 1987, abandoned.

[30] Foreign Application Priority Data

Apr. 2, 1986 [JP] Japan .................. 61-074183

[51] Int. Cl.$^5$ .............................................. C08G 75/16
[52] U.S. Cl. ......................... 528/388; 528/387; 528/487; 528/492
[58] Field of Search ............. 528/387, 388, 492, 487

[56] References Cited

U.S. PATENT DOCUMENTS

| | | | |
|---|---|---|---|
| 3,800,845 | 4/1974 | Scoggin | 528/388 |
| 3,956,060 | 5/1976 | Scoggin | 528/388 |
| 4,025,496 | 5/1977 | Anderson et al. | 528/388 |
| 4,415,729 | 11/1983 | Scoggin et al. | 528/388 |
| 4,464,507 | 8/1984 | Ostlinning et al. | 528/388 |
| 4,495,332 | 1/1985 | Skiiki et al. | 528/388 |
| 4,524,200 | 6/1985 | Sherk et al. | 528/388 |
| 4,595,748 | 6/1986 | Ostlinning et al. | 528/388 |
| 4,631,336 | 12/1986 | Idel et al. | 528/388 |

FOREIGN PATENT DOCUMENTS

| | | | |
|---|---|---|---|
| 140272 | 5/1985 | European Pat. Off. | 528/388 |
| 108135 | 7/1982 | Japan . | |
| 1051034 | 3/1986 | Japan | 528/388 |

*Primary Examiner*—Harold D. Anderson
*Attorney, Agent, or Firm*—Oliff & Berridge

[57] ABSTRACT

Disclosed is a process for the preparation of polyphenylene-sulfide resins, wherein an aromatic polyhalide compound is reacted with an alkali metal sulfide, or hydrogen sulfide and an alkali metal base, or an alkali metal hydrosulfide and an alkali metal base in the presence of an amide polar solvent. A polyphenylene-sulfide resin having a cyclic oligomer content lower than 1.5% by weight, as determined according to the methylene chloride extraction method, is obtained by (a) carrying out the reaction in the absence of polymerization assistant, (b) using the amide polar solvent in an amount not larger than 400 g per mole of the aromatic polyhalide compound, and (c) subjecting the polymerization liquid obtained by the reaction to hot solid-liquid separation at a temperature at least 50° C. but lower than the boiling point of the solvent used, and washing the separated solid with the solvent used for the reaction, which is heated at a temperature at least 50° C. but lower than the boiling point of the solvent.

7 Claims, No Drawings

PROCESS FOR PREPARATION OF POLYPHENYLENE-SULFIDE RESINS IN THE ABSENCE OF SPECIFIC POLYMERIZATION ASSISTANTS

This is a continuation of application Ser. No. 07/030,924, filed Mar. 27, 1987, now abandoned.

BACKGROUND OF THE INVENTION (1) Field of the Invention

The present invention relates to an improved process for the preparation of polyphenylene-sulfide resins, in which low-molecular-weight by-products formed in preparing a polyphenylene-sulfide resin are effectively removed and a polyphenylene-sulfide resin characterized in that generation of a gas is controlled when the resin is mixed with a glass fiber or an inorganic filler and kneaded by an extruder and further in that a molded body having highly improved mechanical strengths is formed from the resin is obtained.

(2) Description of the Related Art

A polyphenylene-sulfide resin has heretofore been used mainly as a resin for injection molding, but this resin has a problem in that when the resin alone is used as a molding material, the resulting molded article has insufficient mechanical strengths, especially impact strength. Accordingly, the polyphenylene-sulfide resin is generally used in the state reinforced with a reinforcer such as a glass fiber or a carbon fiber. Furthermore, an inorganic filler such as talc or calcium carbonate is generally incorporated in the polyphenylene-sulfide resin. An extruder heated at about 300° C. is ordinarily used for kneading the polyphenylene-sulfide resin with such a fibrous reinforcer or a filler. However, if kneading is carried out at such a high temperature, a gas having an extremely unpleasant smell is generated from a vent of the extruder, and therefore, the operation environment is often worsened. Even in the case of the polyphenylene-sulfide resin reinforced with the above-mentioned reinforcer, the impact strength is still not sufficient and an improvement is desired. Particularly, in the case of a thin molded article, an improvement of the impact strength is eagerly desired. The improvement of the mechanical strengths, especially the impact strength, of polyphenylene-sulfide is ordinarily accomplished by increasing the polymerization degree of polyphenylene-sulfide. To increase the polymerization degree of polyphenylene-sulfide, it is necessary that the reaction is carried out in the presence of an expensive polymerization assistant such as a lithium halide, an alkali metal carboxylate or an alkali metal sulfonate, as disclosed in Japanese Unexamined Patent Publication No. 59-115331. The polymerization assistant is used in such a large amount as 0.5 to 1.0 mole per mole of the aromatic polyhalide compound, and it is necessary to separate the polymerization assistant present in a large amount from the obtained polymer and perform the regeneration treatment. Therefore, this technique is not advantageous from the economical viewpoint.

Also a process for preparing polyphenylene-sulfide without using a polymerization assistant is known (see, for example, Japanese Examined Patent Publication No. 45-3,368). As the result of our investigation, it has been found that cyclic low-molecular-weight polymers and non-cyclic low-molecular-weight polymers are contained in the polyphenylene-sulfide resin obtained according to this process and if the content of the cyclic low-molecular-weight polymers is not controlled to a level lower than a specific value, generation of a gas cannot be controlled to a satisfactory extent and the mechanical strengths, especially the impact strength, cannot be substantially improved.

SUMMARY OF THE INVENTION

It is the primary object of the present invention to provide, a process for preparing, without using a polymerization assistant as described above, polyphenylene-sulfide having a high degree of polymerization and improved mechanical strengths, especially impact strength and not generating an unpleasant smell at a high-temperature treatment.

In accordance with the present invention, there is provided a process for the preparation of polyphenylene-sulfide resins, which comprises reacting an aromatic polyhalide compound with an alkali metal sulfide, or hydrogen sulfide and an alkali metal base, or an alkali metal hydrosulfide and an alkali metal base in the presence of an amide polar solvent to form a polyphenylene-sulfide resin, characterized in that (a) the reaction is carried out in the absence of a polymerization assistant, (b) the amide polar solvent is used in an amount not larger than 400 g per mole of the aromatic polyhalide compound, and (c) the polymerization liquid obtained by completion of the reaction is subjected to hot solid-liquid separation at a temperature of at least 50° C. but lower than the boiling point of the solvent used, and the separated solid is washed with the solvent used for the reaction, which is heated at a temperature of at least 50° C. but lower than the boiling point of the solvent, to remove the mother liquid adhering to the solid, whereby a polyphenylene-sulfide resin having a cyclic oligomer content lower than 1.5% by weight, as determined according to the methylene chloride extraction method, is obtained.

DESCRIPTION OF THE PREFERRED EMBODIMENTS

A polymer comprising at least 90 mole % of recurring units represented by the formula

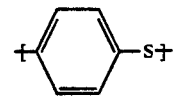

is preferred as the polyphenylene-sulfide having a high polymerization degree, obtained according to the process of the present invention. If the content of these recurring units is lower than 90 mole %, the crystallinity and heat resistance of the polymer are degraded. Generally, the polymer may contain other copolycondensation units, so far as the content is up to 10 mole %. As such copolycondensation units, there can be mentioned trifunctional units such as

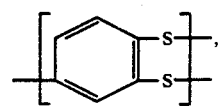

ether units such as

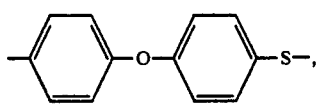

sulfone units such as

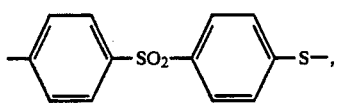

ketone units such as

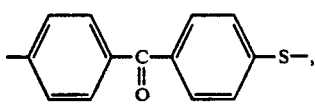

meta-bonding units such as

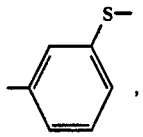

sulfide bonds containing a phenyl nucleus having an alkyl or aryl substituent and aliphatic sulfide bonds.

The polyphenylene-sulfide consisting of the above-mentioned structural units is synthesized by sulfidizing an aromatic polyhalide compound, especially one composed mainly of a p-dihalogenzene such as p-dichlorobenzene or p-dibromobenzene, with a sulfur source selected from an alkali metal sulfide, a combination of hydrogen sulfide and an alkali metal base and a combination of an alkali metal hydrosulfide and an alkali metal base. As the sulfur source, there are preferably used a combination of sodium hydrosulfide and sodium hydroxide, sodium sulfide and a combination of hydrogen sulfide and sodium hydroxide. The alkali metal sulfide or alkali metal hydrosulfide may be used in the form of a hydrate.

In the present invention, organic solvents having an amide bond in the molecule, such as hexamethylphosphoramide, dimethylsulfoxide, dimethylacetamide, N-alkyl-lactam and N,N-dialkylimidazolidinone, are used as the amide polar solvent. Among them, N-alkyl-lactams are preferred, and N-methylpyrrolidone is especially preferred.

The above-mentioned sulfur source is mixed with the reaction solvent in advance, and before the condensation reaction, the mixture should be dehydrated so that the water content is lower than the predetermined level. The dehydration is ordinarily accomplished by distillation. The water content in the reaction mixture is controlled to a level not higher than 5% by weight, preferably not higher than 1.0% by weight, based on the charged reaction components. The reason is that if the water content in the reaction mixture is too high, a polymer having a high molecular weight is difficult to obtain. In order to remove water from the reaction mixture effectively, it is preferable to carry out the reaction in a reaction or dehydration vessel equipped with a partial condenser having a rectifying effect.

However, we found that the intended polymer having a reduced content of cyclic low-molecular-weight polymers cannot be obtained only by controlling the water content in the reaction mixture but the preparation of the intended polymer depends rather on the amount of the reaction solvent use, that is, the concentration of the reaction components. In general, a higher concentration of the reaction components is preferred. That is, a smaller amount of the solvent used is preferred. However, if the amount of the solvent used is too small, uniform stirring becomes impossible and various disadvantages are brought about. In view of the ease of the above-mentioned dehydration and the controllability of the amount of the solvent used for the reaction, it is preferable to adopt a method in which the solvent is charged at the dehydrating step in an amount larger than the amount used for the reaction, and the excessive solvent is removed by distillation after termination of the dehydration while the amount of the distilled solvent is measured and controlled. The amount of the solvent used at the dehydrating step is not particularly critical, but in general, the solvent is used in an amount of more than about 400 g per mole of the aromatic polyhalide compound. However, after termination of the dehydration, that is, at the time of the reaction, the amount of the solvent is important. In general, the solvent alone is distilled after termination of the dehydration so that the amount of the solvent is adjusted to a level smaller than 400 g, preferably 225 to 340 g, per mole of the aromatic polyhalide compound. Incidentally, since the concentration of the reaction components in the reaction mixture is maintained at a high level, in view of the ease of handling, preferably, the solvent be added to dilute the reaction mixture after completion of the reaction.

The aromatic polyhalide compound is added to the dehydrated reaction mixture to effect polycondensation. It is preferred that the amount used of the alkali metal sulfide, the combination of hydrogen sulfide and the alkali metal base or the combination of the alkali metal hydrosulfide and the alkali metal base be 0.98 to 1.02 moles (as calculated as the alkali metal sulfide) per mole of the aromatic polyhalide compound. The reaction temperature is in the range of from 200° to 280° C. The reaction is carried out with stirring for 1 to 10 hours. Since generation of heat is caused at the initial stage, the reaction temperature may be changed stepwise. After termination of the reaction, the reaction mixture is cooled below 200° C., but if the temperature is excessively lowered, the reaction mixture becomes waxy and discharge of the reaction product from the reaction vessel becomes impossible. Accordingly, preferably, a predetermined amount of the solvent be supplied into the reaction vessel to dilute the reaction mixture. It is preferred that the amount of the solvent added for dilution be such that the content of the solids (the total amount of the formed polymer and sodium chloride formed as a by-product) in the slurry is 20 to 35% by weight. It is necessary that the solvent used for dilution be heated in advance so as to prevent abrupt lowering of the temperature.

The diluted and slurried reaction mixture is subjected to hot solid-liquid separation by using a solid-liquid separator such as a filtering device or a centrifugal separator, and the mother liquid adhering to the separated solid is removed by washing with the heated solvent to obtain a solid substantially free of the adhering mother liquid. The temperature is important at these operations. It is necessary that the operations of solid-liquid separation and solvent-washing be carried out at a temperature at least 50° C. but lower than the boiling point of the solvent, preferably from 100° to 190° C. The reason is that even if the amount of low-molecular-weight impurities can be reduced by reducing the amount of the solvent at the time of the reaction, it is impossible to reduce the impurity content to zero, and the formed low-molecular-weight impurities must be removed. The temperature dependency of the solubility of the impurities in solvent is large, and a higher liquid temperature results in a higher removal efficiency. However, if the liquid temperature is too high, the intended polymer is undesirably simultaneously separated. In the present invention, it is important to separate and remove cyclic low-molecular-weight polymers. As the cyclic low-molecular-weight polymers formed as by-products, there can be mentioned cyclic low-molecular-weight compounds represented by the general formula

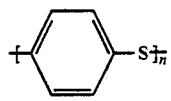

($n = 2$ to 7, molecular weight = 216 to 756), inclusive of dibenzothiophene of the formula

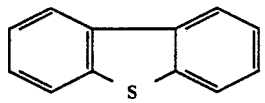

(molecular weight = 184). These compounds, especially dibenzothiophene, have a low molecular weight and have a boiling point of about 332° C., and at the kneading step using an extruder or the injection molding step, these compounds are gasified to generate an unpleasant smell and cause reduction of the physical properties. These low-molecular-weight compounds can be analyzed by the gas chromatography using a thermal decomposition furnace at a thermal decomposition furnace temperature of 300° to 30° C. and a column temperature of 200° to 250° C. Moreover, these cyclic low-molecular-weight compounds inclusive of dibenzothiophene can be determined by the mass analysis (EI-MS) according to the electron impact ionization method. Furthermore, these low-molecular-weight compounds can be extracted and separated by using a solvent such as methylene chloride, chloroform or acetone. Non-cyclic low-molecular-weight polymers are formed as well as the above-mentioned cyclic low-molecular-weight compounds. As such non-cyclic low-molecular-weight polymers, there can be mentioned compounds of the general formula

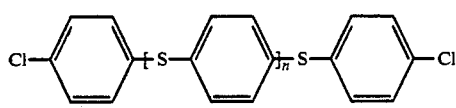

($n = 0$ to 3, molecular weight = 225 to 579) and compounds represented by the general formula

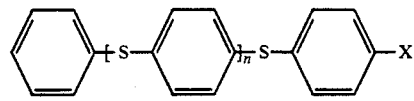

($X = H$ or $Cl$, $n = 0$ to 3).

When the polyphenylene-sulfide resin containing the cyclic and non-cyclic low-molecular-weight polymers was heat-treated in an oxidative atmosphere to effect partial crosslinking and the resulting polyphenylene-sulfide resin having a melt viscosity suitable for injection molding was examined, it was found that the cyclic low-molecular-weight polymers were left in the resin, but the content of the non-cyclic low-molecular-weight polymers was drastically reduced and these polymers were not substantially detected. Accordingly, even where the non-cyclic low-molecular-weight polymers are present, if the resin is heat-treated in an oxidative atmosphere to form crosslinks, no substantial trouble is caused to occur. Moreover, when the dependency of the mechanical strengths of the resin upon the amount of the remaining cyclic low-molecular-weight polymers was examined, it was found that the mechanical strengths can be highly improved by reducing the content of the cyclic low-molecular-weight polymers.

The cake obtained by the solid-liquid separation is directly placed in contact with water or hot water to dissolve sodium chloride formed as a by-product, or the adhering solvent is evaporated and the cake is then placed in contact with water or hot water to dissolve sodium chloride, and then, sodium chloride is removed by filtration or centrifugal separation. If dissolution removal of sodium chloride is performed under atmospheric pressure, the dissolution-filtration operation should be repeated several times, but under an elevated pressure, sodium chloride can be removed more efficiently. The polyphenylene sulfide, from which sodium chloride has been removed, can be dried by heating at 50° to 150° C. under atmospheric or reduced pressure.

Since the melt viscosity of the so-obtained resin is low, the resin can be directly used only for a paint or as a special molding material. Accordingly, the resin is ordinarily partially crosslinked in an oxidative atmosphere whereby the molecular weight of the polymer, that is, the melt viscosity of the polymer, is increased. Therefore, this partially crosslinked polymer is widely used for general purposes. In general, partial cross-linking can be accomplished by heat-treating the powdery polymer at a temperature of 200° to 270° C. under circulation of air or by contacting the melt of the polymer with air at 290° to 350° C. by using a device such as an extruder. If an oxidant such as hydrogen peroxide or chlorite is used, partial crosslinking can be accomplished at a relatively low temperature of 60° to 90° C. Preferably, the melt viscosity be adjusted to 70 to 500 Pa.S, especially 150 to 400 Pa.S, as measured at 300° C. by the partial crosslinking. Incidentally, the melt viscosity is measured under a load of 10 kgf by using a Koka type flow tester and a nozzle having a diameter of 0.5 mm and a length of 1.0 mm.

According to the process of the present invention, low-molecular-weight impurities formed as by-products in the preparation of the resin can be effectively removed and polyphenylene-sulfide resin in which generation of a gas is effectively controlled at the high-temperature kneading step and which provides a molded article having highly improved mechanical strengths, especially impact strength, can be obtained.

The present invention will now be described in detail with reference to the following examples.

EXAMPLE 1

A stainless steel autoclave equipped with a partial condenser and having a capacity of 1 liter was charged with 91 g (0.7 mole) of flaky sodium sulfide hydrate ($Na_2S$ content=60%) and 315 g of N-methylpyrrolidone, and dehydration was carried out under heating by circulating nitrogen gas. When the amount of hydrous N-methylpyrrolidone distilled at a temperature of 210° C. reached 148 g, the mixture was cooled to 170° C. Then, 102.9 g (0.7 mole) of p-dichlorobenzene was added to the reaction mixture and reaction was carried out under a nitrogen gas pressure of $2 \times 10^5$ Pa with stirring for 2 hours at 220° C. and for 3 hours at 260° C. After termination of the reaction, the reaction mixture was cooled to 180° C. and the inner pressure was gradually returned to atmospheric pressure, and the reaction mixture was diluted with 110 g of N-methylpyrrolidone heated at 180° C. Then, the reaction mixture was subjected to reduced pressure filtration at 150° C. by using a reduced pressure filter comprising a 325-mesh stainless steel net having a diameter of 10 cm. The filter cake was washed three times with 30 g of N-methylpyrrolidone maintained at 150° C., and then, the cake was washed five times with 300 g of hot water maintained at 80° to 90° C. to remove sodium chloride. The water-washed polymer was dried under a reduced pressure at 150° C. to obtain 72.5 g of a white powdery polymer. When the content of dibenzothiophene in about 10 mg of the powdery polymer was measured by the gas chromatography using a thermal decomposition furnace, it was found that the content of dibenzothiophene was 660 ppm.

For comparison, the dibenzothiophene content in Ryton V-1 (commercially available polyphenylene-sulfide supplied by Phillips Petroleum Company, U.S.A.) was similarly measured. It was found that the dibenzothiophene content was 4,700 ppm.

A breaker was charged with 50 g of the obtained powdery polymer, and the polymer was heat-treated in a hot air drier maintained at 260° C. while stirring the polymer now and then. When the heat treatment was conducted for 6 hours, the melt viscosity became 260 Pa.S. At this point, the polymer was cooled and the treatment was stopped. The obtained powdery polymer and Ryton P-4 (supplied by Phillips Petroleum Company, U.S.A.) were analyzed. The obtained results are shown in Table 1. Incidentally, when m/z of EI-MS of Ryton P-4 was determined, the detection sensitivity was reduced to 1/10.

TABLE 1

| | Polymer of Example 1 | Ryton P-4 |
|---|---|---|
| Appearance | Brown powder | Brown powder |
| Methylene chloride extraction ratio (%) | 0.48 | 2.1 |
| Dibenzothiophene content (ppm) | 290 | 2,790 |
| m/z of EI/MS | | |
| 184 | + | ++ |
| 216 | + | + |
| 324 | − | + |
| 432 | + | + |
| 540 | ++ | +++ |
| 648 | + | ++ |
| | Other m/z was not substantially detected | Other m/z was detected |

As is apparent from the results shown in Table 1, the content of cyclic low-molecular-weight impurities in the polyphenylene-sulfide resin obtained according to the process of the present invention is much lower than in the commercially available product.

COMPARATIVE EXAMPLE 1

A polyphenylene-sulfide resin was prepared from the same components as used in Example 1 in the same manner as described in Example 1 except that p-dichlorobenzene was added in the form of a solution in 130 g of N-methylpyrrolidone (NMP). After completion of the reaction, the reaction mixture was cooled to room temperature and 110 g of NMP was added to the mixture. The mixture was filtered at room temperature. Other procedures were the same as described in Example 1. As the result, 73 g of a white powder was obtained.

The dibenzothiophene content in this polymer was 2,300 ppm. When the polymer was heat-treated in the same manner as described in Example 1, a considerably strong unpleasant smell was generated from the hot air drier. When the heat treatment was conducted for 10 hours, the melt viscosity became 320 Pa S. At this point, the heat treatment was stopped. The methylene chloride extraction ratio of the obtained polymer was 2.6%.

EXAMPLE 2

An autoclave having a capacity of 100 l, which was equipped with a jacket having an inner diameter of 80 mm and a length of 1,200 mm and a partial condenser filled with Raschig rings was charged with 9.1 kg (0.07 kg-mole) of flaky sodium sulfide hydrate ($Na_2S$ content=60%), and 0.18 kg of 48% aqueous sodium hydroxide and 21 kg of NMP were added. The temperature was elevated and dehydration was carried out under circulation of nitrogen gas. When the temperature of the reaction mixture became 210° C. and the distilled amount of hydrous NMP reached 7.8 kg (3.6 kg of which was water), the dehydration was stopped and the mixture was cooled to 170° C. Then, 10.29 kg (0.07 kg-mole) of p-dichlorobenzene, 12.7 g (0.07 mole) of 1,2,4-trichlorobenzene and 3.5 kg of NMP were added to the mixture, and reaction was carried out under a nitrogen gas pressure of $3.0 \times 10^5$ Pa at 220° C. for 2 hours and at 260° C. for 3 hours. Then, the reaction mixture was cooled to 190° C. The remaining pressure was released and 43.5 kg of NMP heated at 150° C. was added to the reaction mixture for dilution. Then, the diluted mixture was transferred to a compression filter comprising a net having a mesh size of 25 μm as the element and having a filtration area of 0.2 m² and compression filtration was carried out at a temperature maintained at 150° C. by using nitrogen gas. The adhering mother liquid was removed from the obtained cake by spraying 6 kg of NMP maintained at 150° C. in two times. Then, the wet cake was dried at 150° C. under a reduced pressure of 30 Torr. Then, the dry solid was washed three times with 45 kg of city water maintained at 80° C. and two times with deionized water to remove sodium chloride. The solid was dried at 80° C under a reduced pressure of 30 Torr to obtain a grayish white powdery polymer. The yield was 96.2%. The polymer was heat-treated at 240° C. with stirring in an oven, and when the melt viscosity reached 250 Pa.S, the polymer was cooled. In order to obtain a sample to be used for the measurement of the mechanical strengths, the polymer was extruded in the form of a strand at a temperature of 300° to 320° C. by using an extruder, and the strand was chipped. Molding was carried out at a mold temperature of 120° C. by using an injection molding machine, and the physical properties of the molded article were determined. The obtained results are shown in Table 2.

EXAMPLES 3 THROUGH 5 AND COMPARATIVE EXAMPLES 2 AND 3

Polyphenylene-sulfide resins were prepared in the same manner as described in Example 2 except that conditions shown in Table 2 were adopted. The obtained results are shown in Table 2.

TABLE 2

|   | Example 2 | Example 3 | Example 4 | Example 5 | Comparative Example 2 | Comparative Example 3 |
|---|---|---|---|---|---|---|
| (1) Amount (g/mole) of NMP used at reaction | 290 | 290 | 250 | 220 | 400 | 450 |
| (2) Filtration temperature (°C.) | 150 | 100 | 80 | 160 | 30 | 30 |
| (3) Yield (%) of polymer | 96.2 | 96.4 | 97.2 | 96.0 | 96.8 | 97.0 |
| (4) Smell at operation in extruder | Slight | Slight | Slight | Slight | Extreme | Extreme |
| (5) Melt viscosity (Pa · S at 300° C.) after heat treatment | 250 | 220 | 280 | 260 | 230 | 250 |
| (6) Methylene chloride extraction ratio (%) | 0.8 | 1.2 | 1.3 | 0.7 | 2.1 | 2.3 |
| (7) Dibenzothiophene content (ppm) | 405 | 530 | 540 | 320 | 2,950 | 3,400 |
| (8) Mechanical strength characteristics of non-reinforced polymer | | | | | | |
| Flexural strength (kg/cm$^2$) | 1,270 | 1,120 | 1,150 | 1,320 | 844 | 795 |
| Flexural modulus (kg/cm$^2$) | 35 × 10$^3$ | 35 × 10$^3$ | 35 × 10$^3$ | 35 × 10$^3$ | 34 × 10$^3$ | 34 × 10$^3$ |
| Tensile strength (kg/cm$^2$) | 523 | 510 | 512 | 680 | 420 | 418 |
| Izod impact strength (kg · cm/cm$^2$) | | | | | | |
| notched | 1.4 | 1.4 | 1.3 | 1.8 | 1.2 | 1.1 |
| unnotched | 12.9 | 11.9 | 11.1 | 13.8 | 5.1 | 4.9 |

We claim:

1. An improvement in a process for preparing a polyphenylene-sulfide resin, comprising:
   dehydrating a mixture of (1) a sulfur source selected from the group consisting of (i) an alkali metal sulfide, (ii) hydrogen sulfide and an alkali metal base, and (iii) an alkali metal hydrosulfide and an alkali metal base, and (2) an amide polar solvent; adding (3) an aromatic polyhalide compound to the dehydrated mixture; and maintaining the resulting mixture at a temperature of 200° to 280° C. for 1 to 10 hours to effected a polymerization reaction of the sulfur source with the aromatic polyhalide compound in the presence of the amide polar solvent;
   wherein the improvement consists essentially of:
   (a) polymerizing the sulfur source and the aromatic polyhalide compound in the absence of a polymerization assistant selected from the group consisting of an alkali metal halide, an alkali metal carboxylate and an alkali metal sulfonate;
   (b) the polymerization solvent consists of said amide polar solvent and is present in an amount less than 400 g per mole of the aromatic polyhalide compound during the polymerization reaction, and the polymerization reaction is completed to produce a solid-liquid polymerization liquid; and
   (c) subjecting the polymerization liquid to solid-liquid separation while the polymerization liquid is maintained at a temperature of at least 50° C. but lower than the boiling point of the solvent present during the solid-liquid separation and while the solvent is maintained in the liquid state, separating a solid, and washing the separated solid with a solvent consisting of the reaction solvent, which is maintained at a temperature of at least 50° C. but lower than the boiling point of the solvent during the washing, whereby a polyphenylene-sulfide resin having a cyclic oligomer content lower than 1.5% by weight, as determined according to the methylene chloride extraction method, is obtained.

2. The process according to claim 1 wherein the polyphenylene-sulfide resin prepared has at least 90% by mole of recurring units represented by the formula

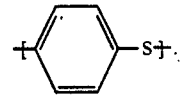

3. The process according to claim 1, wherein the amide polar solvent is selected from the group consisting of hexamethylphosphoramide, dimethylacetamide, N-alkyl-lactam.

4. The process according to claim 1, wherein the amount of the amide polar solvent is from 225 to 340 g per mole of the aromatic polyhalide compound.

5. The process according to claim 1, wherein the amount of the alkali metal sulfide, the combination of hydrogen sulfide and an alkali metal base or the combination of an alkali metal hydrosulfide and an alkali metal base is 0.98 to 1.02 moles, as calculated as the alkali metal sulfide, per mole of the aromatic polyhalide compound.

6. The process according to claim 1 wherein the polymerization liquid obtained by completion of the reaction is diluted with the amide polar solvent to an extent such that the content of solids in the diluted liquid is 20 to 35% by weight, and then subjected to the solid-liquid separation.

7. The process according to claim 1 wherein solid-liquid separation and solvent-washing temperature is 100° C. to 190° C.

* * * * *